Sept. 13, 1960 J. W. DOWNIE 2,952,770

TELEVISION TRANSMITTER ALIGNMENT

Filed June 28, 1954

TYPICAL TRANSMITTER CHARACTERISTICS

INVENTOR:
JOHN W. DOWNIE,
BY Julius J. Zaskalicky
HIS ATTORNEY.

2,952,770

TELEVISION TRANSMITTER ALIGNMENT

John W. Downie, East Syracuse, N.Y., assignor to General Electric Company, a corporation of New York Filed June 28, 1954, Ser. No. 444,291

9 Claims. (Cl. 250—17)

Figure 1:
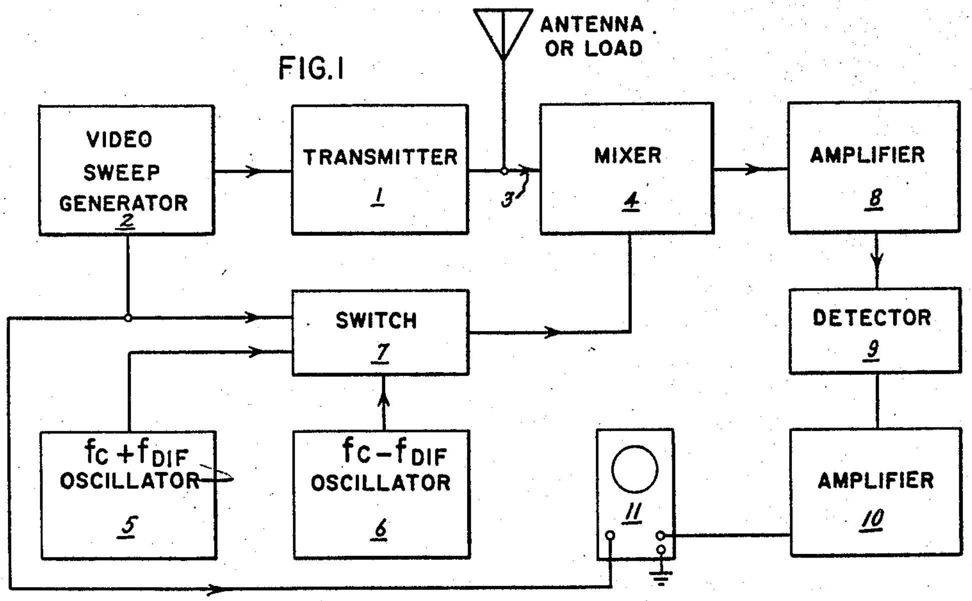

This invention relates to a method of and apparatus for determining the characteristics of electrical apparatus and more particularly to an improved and simple method of and means for determining the frequency response (amplitude versus frequency characteristic) of television transmitter apparatus during normal operation of such apparatus.

Several techniques are available for obtaining such determination. All of these techniques are either involved, or necessitate interrupting the normal operation of the transmitter. The interruption may be in the nature of operating the transmitter at other than normal power levels, or of "breaking" in to the transmitter to make the necessary connections, or of disabling the D.-C. reinsertion means of the transmitter, or may necessitate the use of special apparatus. For example, one such technique utilizes a radio frequency sweep signal approximately eight megacycles wide. It is necessary with such a system to provide a different radio frequency detector for each channel to be monitored. The large number of channels now available in the UHF band of frequencies renders the technique combersome. This and other special problems have made the use of such a system undesirable.

Accordingly, it is an object of the invention to provide new and improved methods and means for determining the frequency response of electronic apparatus.

Another object of the invention is to provide new and improved circuit means for detecting and indicating the frequency response of a television transmitter circuit, the use of which circuit means simplifies the alignment and operation of the transmitter.

It is a further object of the invention to provide new and improved circuit means for detecting and indicating individually the upper and lower sideband frequency response characteristic of a television transmitter while the transmitter is adjusted for normal operation.

A television transmitter normally delivers a carrier that is amplitude modulated with video intelligence signals. The transmitter frequency band extends from a lower, vestigial sideband frequency (about 0.75 megacycle below the nominal carrier frenquency) to the nominal carrier frequency and then to the useful upper sideband frequency (about 4.00 megacycles) above the nominal carrier frequency. In carrying out the invention as applied to such a television transmitter, there is applied to the transmitter a modulating wave that sweeps over the transmitter frequency band at a periodically recurring low frequency repetition rate of the order of 60 cycles per second. The thus modulated carrier is mixed or heterodyned alternately with one and then the other of two signals of predetermined, fixed and high frequency. The two heterodyning frequencies are selected to differ equally from the nominal transmitter carrier frequency, one being approximately 25.00 megacycles above and the other one approximately 25.00 megacycles below the nominal carrier frequency. The difference frequency of approximately 25.00 megacycles is selected as being of the order of the picture intermediate frequency of a conventional television receiver, but may be of any desired suitable magnitude. Accordingly, as the transmitter frequency sweeps from the lower, vestigial sideband frequency to the nominal carrier frequency to the useful upper sideband frequency, the mixing stage delivers a derived or beat frequency wave whose band extends, upon application of the higher heterodyning frequency, from a vestigial beat upper sideband frequency (approximately 25.75 megacycles) to a beat carrier frequency (approximately 25.00 megacycles) to a useful beat lower sideband frequency (approximately 21.00 megacycles), and upon application of the lower heterodyning frequency from a vestigial beat lower sideband frequency (approximately 24.75 megacycles) to the same beat carrier frequency approximately 25.00) megacycles to a useful beat upper sideband frequency (approximately 29.00 megacycles). Thus the two alternate beat frequency wave trains represent the transmitter wave transposed in the frequency spectrum, and additionally the beat frequency wave due to the higher heterodyning frequency includes an inversion of the relative locations of the vestigial and useful frequency bands relative to the derived or beat carrier. Either the frequency band above, or that below the beat carrier frequency is unnecessary for representation of the transmitter frequency response. Accordingly, means are provided for eliminating from the beat frequency trains frequencies appearing on one side of the beat carrier frequency, more particularly those above it. Further means are provided for demodulating the thus filtered wave train thereby to obtain in alternate sequence the upper and lower sideband frequency response of the transmitter which may be observed on an oscilloscope. An advantageous feature of the apparatus of the invention resides in its capability of use for monitoring the frequency responses of transmitters operating at all conventional carrier frequencies.

For further objects and advantages and for a better understanding of the invention, attention is now directed to the following description referring to the accompanying drawing and to the annexed claims wherein the features of novelty which characterize the invention are pointed out with particularity.

In the drawing, Figure 1 is a schematic block diagram of a preferred embodiment of the invention;

Figures 2A through 2E, 3A and 3B show graphs useful in explaining the invention.

Referring to Figure 1, there is illustrated a conventional television transmitter 1, whose video channel is supplied with a video sweep voltage from a conventional video sweep oscillation generator 2. The frequency of the generator 2 varies periodically at a low frequency rate, of the order of 60 cycles per second, and to an extent sufficient to sweep over the modulating range of the transmitter. A portion of the output from the transmitter is supplied over electrical conductor 3 to the radio frequency input of a conventional mixer 4 which heterodynes the transmitter output with waves from a pair of local oscillation generator circuits or oscillators 5 and 6. The latter is connected through a vibrating switch 7 to another input circuit of mixer 4. Switch 7 may conveniently include a reed that vibrates between a pair of contacts connected to the oscillators 5 and 6 respectively. The reed, under the influence of a solenoid, vibrates at the frequency of waves applied to the solenoid, preferably the same frequency as the sweep repetition frequency, of the order of 60 c.p.s. The reed is electrically connected to a source of operating voltage and alternately switches plate voltage to oscillators 5 and 6 at the sweep rate of the generator 2. Any of a variety of well known electronic means may as well be used to perform the functions of switch 7.

The output wave from mixer 4 is, therefore, a modulated wave having a frequency equal to the difference between the frequency of the carrier wave from transmitter 1 and the frequency of the wave from oscillators 5 or 6 depending upon which of the two is connected to supply a wave to mixer 4. This wave is amplified in one or more stages of an amplifier 8, which may be a conventional intermediate frequency amplifier, and supplied to a conventional amplitude detector circuit 9. The detected signal appearing at the output of the detector 9 is the video sweep voltage as modified by the transmitter 1, mixer 4, and amplifier 8 circuits. Since the latter two circuits are designed to simulate as closely as possible the actual characteristics of a typical ideal receiver, any distortion appearing in the detected signal is attributable to the transmitter circuits. The output of detector 9 is amplified in amplifier 10 and supplied to the vertical deflection circuits of a cathode ray tube oscilloscope 11. By properly synchronizing the horizontal sweep of the cathode ray tube oscilloscope 11 with the video sweep generator 2 at the sweep repetition frequency of the latter (60 c.p.s.), separate and therefore distinguishable displays of both upper and lower sideband characteristics of the transmitter circuits are provided, taking advantage of the selectivity of amplifier 8.

Figures 2A, 2B, 2C, 2D, 2E:
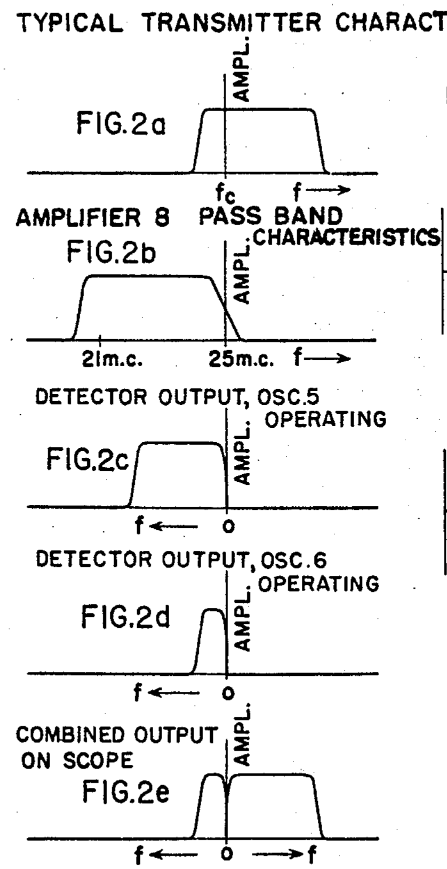

Referring to Figure 2A, there is shown a graph of a typical frequency response curve of a television transmitter designed to operate in accordance with present television standards. The video carrier is indicated to be located at $f_c$. The vestigial sideband is located below the carrier frequency and is approximately 0.75 megacycle wide. The upper or useful sideband is located above the carrier frequency and is approximately four megacycles wide.

Referring to Figure 2B there is shown a graph of the frequency response of amplifier 8, which approaches the response characteristic of the I.F. amplifier in an ideal receiver. It will be observed that this characteristic curve has a linearly decreasing slope portion centered about a frequency of 25 megacycles and is relatively flat from approximately 21 megacycles to approximately 24.25 megacycles.

In accordance with the most preferred embodiment of the invention, local oscillator 5 is adjusted to have an output frequency $f_c+f_{DIF}$ which exceeds the video carrier frequency $f_c$ by 25 megacycles, or other suitable television receiver picture intermediate frequency. The local oscillator 6 is adjusted to have an output frequency $f_c-f_{DIF}$. Therefore, whether switch 7 is positioned to connect the output of oscillators 5 or 6 to mixer circuit 4, the output wave from mixer 4 will be a video modulated wave having a beat carrier frequency of 25 megacycles.

Referring to Figure 2C, there is illustrated a portion of the envelope of the signal which is displayed on the screen of cathode ray tube oscilloscope 11 when the oscillation wave from oscillator 5 is mixed with the transmitter output wave in mixer 4.

Referring to Figure 2D, there is illustrated a portion of the envelope of the signal which is displayed on the screen of cathode ray tube oscilloscope 11 when the oscillation wave from oscillator 6 is mixed with the transmitter wave in mixer 4.

Referring to Figure 2E, there is illustrated a portion of the envelope of the waveform which is displayed on the screen of the cathode ray tube oscilloscope 11 when the oscillation waves from oscillators 5 and 6 are alternately supplied to mixer 4 at the sweep rate of generator 2 and the sweep of the cathode ray tube oscilloscope 11 is synchronized with the sweep repetition frequency of generator 2. Preferably, a symmetrical sweep wave without blanking is utilized for the horizontal deflection of the cathode ray beam. Accordingly, the beam as it passes an arbitrary point in traveling to the right under control of the horizontal sweep will begin to portray the upper sideband (oscillator 5 operating) and on its return as it passes the same arbitrary point in traveling to the left, it will begin to portray the lower sideband (oscillator 6 operating) thereby obtaining the display shown in Figure 2E.

To facilitate an understanding of the theory of operation of the invention, reference is made to Figure 3 wherein are illustrated a plurality of amplitude versus frequency curves.

Figures 3A, 3B:
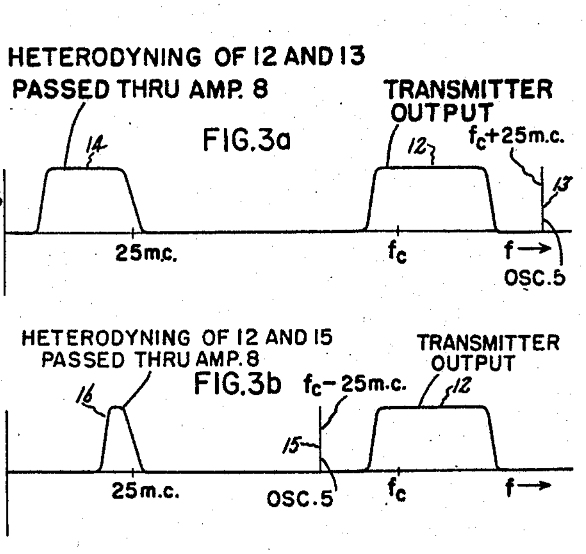

Referring first to Figure 3A, there is illustrated a graph 12 identical in shape with the graph of Figure 2A. The carrier frequency is 83.25 megacycles, that of channel six in the present standard television system. It will be understood that this particular frequency has been chosen for purposes of explanation only, and the invention is equally applicable to other channels, including those in the ultra-high frequency band. Waves extending over the band of frequencies 12 appear at the output of a conventional standard television transmitter when a video sweep generator is connected to supply a constant amplitude, swept frequency video modulating signal thereto. The operation of a conventional video sweep generator and a standard television transmitter are well known in the art and, consequently, for purposes of clarity will not be shown nor described herein.

A wave of frequency 13, which in a preferred embodiment of the invention is obtained from oscillator 5, has a frequency of oscillation of 108.25 megacycles, 25 megacycles greater than the carrier frequency of channel six which is 83.25 megacycles. When waves of frequencies 12 and 13 are heterodyned in mixer 4, the output obtained is a wave whose frequency characteristic is the mirror image of graph 12 with respect to the beat carrier frequency of 25 megacycles which corresponds in location to 83.25 megacycles in the original spectrum. The beat frequency band extends from a lower useful sideband frequency of 21 megacycles to 25 megacycles, and then to a vestigial upper sideband frequency of 25.75 megacycles.

Amplifier 8 has the bandpass characteristics as shown in Figure 2B. It passes frequencies lying within a band extending from below 21 megacycles to approximately 25 megacycles and filters out frequencies above 25 megacycles. The frequencies appearing at the output of amplifier 8 are shown in graph 14 in Figure 3A where substantially only the useful sideband frequencies lying below 25 megacycles (21 to 25 megacycles are passed. The output of amplifier 8 is detected in a conventional detector circuit 9 to provide a video wave having a positive envelope graphically represented in the graph of Figure 2C.

Referring next to Figure 3B, there is illustrated a graph 12 identical in shape and spectrum location with the graph 12 of Figure 2A. A wave of frequency 15, which may be obtained from oscillator 6, has a frequency of oscillation of 58.25 megacycles, 25 megacycles less than the carrier frequency of wave 12. When waves of frequencies 12 and 15 are heterodyned in mixer 4, the graph of amplitude versus frequency output which is obtained has the identical shape to graph 12 with a carrier frequency transposition from 83.25 megacycles to 25 megacycles. The beat frequency band extends from a lower vestigial sideband frequency of 24.25 megacycles to 25 megacycles and then to a useful upper sideband frequency of 29 megacycles.

As mentioned above, amplifier 8 has the bandpass characteristic as shown in Figure 2B. Accordingly, as shown in graph 16 in Figure 3B, substantially only the vestigial sideband frequencies lying below 25 megacycles (24.25 to 25 megacycles) are passed. The output of amplifier 8 is detected in a conventional detector circuit 9 to provide a video wave having a positive envelope graphically represented in the graph of Figure 2D.

It will thus be seen that the envelope of the detected wave which is obtained when mixer 4 is supplied with a wave having a frequency 25 megacycles above the video carrier frequency of the transmitter is identical with that portion of the curve of Figure 2A above the carrier frequency, and that when mixer 4 is supplied with a wave having a frequency 25 megacycles below the video carrier frequency of the transmitter, the envelope is identical with that portion of the curve of Figure 2A below the carrier frequency. By properly combining the waveforms of Figures 2C and 2D as mentioned above, the graph of Figure 2E, which is identical to the amplitude versus frequency characteristic of the transmitter 1 (as shown in Fig. 2A) is obtained.

It should be noted that the two alternate wave trains delivered by amplifier 8 overlap, as one ranges from 21 to 25 megacycles, and the other from 24.25 to 25 megacycles. Unless care is taken in synchronizing the sweep repetition of generator 2, the switching rate of switch 7, and the horizontal sweep of oscilloscope 11, the two alternate wave trains could not be observed separately on the oscilloscope 11. In accordance with the teachings of the invention, switch 7 is synchronized with video sweep oscillation generator 2 such that the oscillation wave from oscillator 5 is supplied to mixer 4 during one sweep and the wave from oscillator 6 is supplied to mixer 4 during the succeeding sweep of the wave from generator 2. If, for example, video sweep generator 2 provides a sixty cycle per second sweep of the video frequency band, switch 7 also operates at sixty cycles per second. To provide on the screen of cathode ray tube oscilloscope 11 separately observable displays of the two alternate wave trains, one swept from the origin (25 megacycles) to the right and the other to the left (Fig. 2E), i.e. an oscillation wave having an envelope which is identical in shape with the amplitude versus frequency characteristic of the transmitter circuits, the sweep frequency of the oscilloscope is also adjusted to be sixty cycles per second and in phase with sweep generator 2 and switch 7. Thus, when properly synchronized, the beam as it passes an arbitrary point in traveling to the right under control of the horizontal sweep will begin to portray the upper sideband (oscillator 5 operating). On its return as it passes the same arbitrary point in traveling to the left, it will begin to portray the lower sideband (oscillator 6 operating).

An important advantage of the invention in the alignment of television transmitter circuits is that the person making the alignment is able to immediately observe the effects of his adjustments on the over-all bandpass characteristics of the transmitter. Furthermore, the transmitter may be set up for normal operation with its clamp circuits and the sweep signal mixed with standard blanking and synchronizing signals before being applied to the transmitter input. Since the operation of other sections of the transmitter frequently affect the amplitude versus frequency characteristic of the video circuits, this constitutes an important advantage of the circuit of the invention over previously known alignment arrangements.

While the invention has been described with reference to a particular embodiment thereof, it will, of course, be understood that various modifications may be made without departing from the invention. The appended claims are intended to cover all such changes and modifications as fall within the true spirit and scope of the invention.

What I claim as new and desire to secure by Letters Patent of the United States is:

1. In transmitter apparatus to which is applied a modulating wave and from which is obtained a carrier wave modulated in amplitude by said modulating wave, apparatus for determining the frequency response of said transmitter apparatus comprising means for applying to said transmitter apparatus a modulating wave periodically varying in frequency at a low frequency rate over the modulating range of said transmitter, first and second means for generating high frequency waves of fixed frequencies, means responsive to said first and second means for generating high frequency waves of fixed frequencies for heterodyning the output from said transmitter apparatus at said low frequency rate with one and then the other fixed higher frequency wave to derive alternate beat frequency wave trains, the fixed frequency of one of said high frequency waves being greater than the frequency of said carrier wave by a predetermined difference frequency and the fixed frequency of the other of said high frequency waves being less than the frequency of said carrier wave by said predetermined difference frequency, whereby said alternate beat frequency wave trains correspond to said modulated transmitter carrier wave in the sense that the beat carrier frequency, which equals said difference frequency, corresponds to the nominal transmitter carrier frequency in the case of each of said alternate wave trains, and that in the case of the second of said beat frequency wave trains the upper and lower sidebands correspond to those of said transmitter in direct order, and in the case of the first of said beat frequency wave trains the upper and lower side band correspondence is in inverted, mirror image order, selective means for rejecting substantially all of the frequencies in said derived trains of waves on one side of said beat carrier frequency except those in the immediate vicinity of said beat carrier frequency and passing all other frequencies in said trains of waves, and means for detecting the amplitudes of said other frequencies passed by said selective means.

2. In transmitter apparatus to which is applied a modulating wave and from which is obtained a carrier wave modulated in amplitude by said modulating wave, apparatus for determining the frequency response of said transmitter apparatus comprising means for applying to said transmitter apparatus a modulating wave periodically varying in frequency at a low frequency rate over the modulating range of said transmitter apparatus, first and second fixed frequency means for generating high frequency waves respectively having first and second frequencies, means for heterodyning the output from said transmitter apparatus at said low frequency rate with one and then the other fixed high frequency wave from said first and second fixed frequency means, the frequency of one of said high frequency waves being greater than the frequency of said carrier wave by a predetermined difference frequency and the frequency of the other of said high frequency waves being less than the frequency of said carrier wave by said predetermined difference frequency, whereby said alternate beat frequency wave trains correspond to said modulated transmitter carrier wave in the sense that the beat carrier frequency, which equals said difference frequency, corresponds to the nominal transmitter carrier frequency in the case of each of said alternate wave trains, and that in the case of the second of said beat frequency wave trains the upper and lower sidebands correspond to those of said transmitter in direct order, and in the case of the first of said beat frequency wave trains the upper and lower side band correspondence is in inverted mirror image order, selective means having an amplitude versus frequency bandpass characteristic curve with a linearly decreasing slope portion centered about said beat carrier frequency, means for applying said pair of trains of waves to said selective means, and means for demodulating the output from said selective means.

3. In apparatus to which is applied a modulating wave and from which is obtained a carrier wave modulated in amplitude by said modulating wave, the method of individually measuring the upper and lower side band frequency characteristic of said apparatus comprising applying to said apparatus a modulating wave periodically varying in frequency at a low frequency rate over the modulating range of said apparatus, alternately heterodyning the output from said apparatus at said low frequency rate with one and then the other of a pair of high frequency waves each of fixed frequency, the fixed frequency of one of said high frequency waves being greater than the frequency of said carrier wave by a predetermined difference frequency and the fixed frequency of the other of said high frequency waves being less than the frequency of said carrier wave by said predetermined difference frequency, thereby to derive alternate beat frequency wave trains which correspond to said modulated apparatus carrier wave in the sense that the beat carrier frequency, which equals said difference frequency, corresponds to the nominal apparatus carrier frequency in the case of each of said alternate wave trains, and that in the case of the second of said beat frequency wave trains the upper and lower sideband correspond to those of said transmitter in direct order, and in the case of the first of said beat frequency wave trains the upper and lower sideband correspondence is in inverted mirror image order, and detecting the amplitude of said beat frequency wave trains.

4. Apparatus for indicating the upper and lower sideband frequency response of a video frequency transmitter comprising a video sweep generator adapted to provide a modulating signal to modulate the transmitter, first fixed frequency signal means to produce a first signal having a fixed frequency which is higher than the carrier frequency of the modulated transmitter by a predetermined frequency, second fixed frequency signal means for producing a second signal having a fixed frequency which is lower than the carrier frequency by said predetermined frequency, heterodyne means, switching means for alternately feeding signals from said first and second fixed frequency signal means to said heterodyne means alternately to produce first and second heterodyne signals near said predetermined frequency corresponding to the upper sideband and lower sideband respectively of the modulated transmitter, and indicating means responsive to signals near said predetermined frequency from said heterodyne means to indicate the upper and lower sidebands of the modulated transmitter.

5. Apparatus for displaying the upper and lower sideband frequency response of a video frequency transmitter comprising a video sweep generator adapted to provide a modulating signal to modulate the transmitter, first and second fixed frequency signal means to produce respectively a first signal having a fixed frequency which is higher than the carrier frequency of the modulated transmitter by a predetermined frequency and a second signal having a fixed frequency which is lower than the carrier frequency by said predetermined frequency, heterodyne means alternately responsive to said first and second fixed frequency signal means and adapted to respond to the output signal of the modulated transmitter to alternately produce first and second heterodyne signals near said predetermined frequency corresponding to the upper sideband and lower sideband respectively of the modulated transmitter, selective means responsive to signals near said predetermined frequency from said heterodyne means, and display means responsive to said selective means to display the upper and lower sidebands of the modulated transmitter.

6. Apparatus for indicating the upper and lower sideband frequency response of a video frequency transmitter comprising a video sweep generator adapted to provide a modulating signal to modulate the transmitter, a first fixed frequency oscillator to produce a first signal having a fixed frequency which is higher than the carrier frequency of the modulated transmitter by a predetermined frequency, a second fixed frequency oscillator to produce a second signal having a fixed frequency which is lower than the carrier frequency by said predetermined frequency, switching means responsive to said first and second fixed frequency oscillators and to said video sweep generator to pass said first and second fixed frequency signals alternately and in synchronism with said video sweep generator, heterodyne means responsive to said switching means and adapted to respond to the output signal of the modulated transmitter to alternately produce first and second heterodyne signals near said predetermined frequency corresponding to the upper sideband and lower sideband respectively of the modulated transmitter, and indicating means responsive to signals near said predetermined frequency from said heterodyne means to indicate the upper and lower sideband of the modulated transmitter.

7. In transmitter apparatus to which is applied a modulating wave and from which is obtained a carrier wave modulated in amplitude by said modulating wave, apparatus for determining the frequency response of said transmitter apparatus comprising means for applying to said transmitter a modulating wave periodically varying in frequency at a low frequency rate over the modulating range of said transmitter, first and second fixed frequency wave generating means, means responsive to said first and second fixed frequency wave generating means for heterodyning the output from said transmitter at said low frequency rate first with one and then the other high frequency wave of fixed frequency to derive a train of waves, the fixed frequency of one of the waves from said first fixed frequency wave generating means being greater than the frequency of said carrier wave by a predetermined difference in frequency and the fixed frequency of the waves from said second fixed frequency wave generating means being less than the frequency of said carrier wave by said predetermined difference in frequence, frequencies of said derived train of waves at said low frequency rate corresponding to one sideband and then the other sideband of the output from said transmitter apparatus, selective means for passing only those waves in said derived train of waves having frequencies corresponding to one sideband or the other sideband of said modulated carrier wave, and means for detecting the amplitudes of said passed waves.

8. Apparatus for displaying the upper and lower sideband frequency response of a video frequency transmitter comprising a video sweep generator adapted to provide a modulating signal to modulate the transmitter, a first fixed frequency oscillator to produce a first signal having a fixed frequency which is higher than the carrier frequency of the modulated transmitter by a predetermined frequency, a second fixed frequency oscillator to produce a second signal having a fixed frequency which is lower than the carrier frequency by said predetermined frequency, switching means responsive to said first and second fixed frequency oscillators and to said video sweep generator to pass said first and second fixed frequency signals alternately and in synchronism with said video sweep generator, heterodyne means responsive to said switching means and adapted to respond to the output signal of the modulated transmitter to alternately produce first and second heterodyne signals near said predetermined frequency corresponding to the upper sideband and lower sideband respectively of the modulated transmitter, selective means responsive to signals near said predetermined frequency from said heterodyne means, and cathode ray tube means responsive to said selective means and said video sweep generator to display one sideband of the modulated transmitter on one sweep and the other sideband on the return sweep.

9. Apparatus for displaying the upper and lower sideband frequency response of a video frequency transmitter comprising a video sweep generator adapted to provide a modulating signal to modulate the transmitter, a first fixed frequency oscillator to produce a first signal having a fixed frequency which is higher than the carrier frequency of the modulated transmitter by a predetermined frequency, a second fixed frequency oscillator to produce a second signal having a fixed frequency which is lower than the carrier frequency by said predetermined frequency, switching means responsive to said first and second fixed frequency oscillators and to said video sweep generator to pass said first and second fixed frequency signals alternately and in synchronism with said video sweep generator, heterodyne means responsive to said switching means and adapted to respond to the output signal of the modulated transmitter to alternately produce first and second heterodyne signals near said predetermined frequency corresponding to the upper sideband and lower sideband respectively of the modulated transmitter, selective means responsive to signals near said predetermined frequency from said heterodyne means, and cathode ray tube means responsive to said selective means and said video sweep generator to display one sideband of the modulated transmitter on one sweep beginning from an arbitrary point and the other sideband on the return sweep beginning from said arbitrary point.

References Cited in the file of this patent

UNITED STATES PATENTS

| | | |
|---|---|---|
| 2,525,675 | Heller | Oct. 10, 1950 |
| 2,635,183 | Smith et al. | Apr. 14, 1953 |
| 2,646,461 | Grace et al. | July 21, 1953 |
| 2,681,437 | Leyton | June 15, 1954 |

OTHER REFERENCES

A Sweep Frequency Method for Measuring the Transmission Amplitude Characteristic of a Television Transmitter by John Ruston, Technical paper presented at 1951 IRE Convention.